3,836,611
PROCESS FOR PRILLING UREA
Ivo Mavrovic, 530 E. 72nd St.,
New York, N.Y. 10021
Continuation-in-part of abandoned application Ser. No. 104,998, Jan. 8, 1971, which is a continuation-in-part of application Ser. No. 255,726, May 22, 1972. This application May 22, 1972, Ser. No. 255,760
Int. Cl. B01j 2/04
U.S. Cl. 264—14                              4 Claims

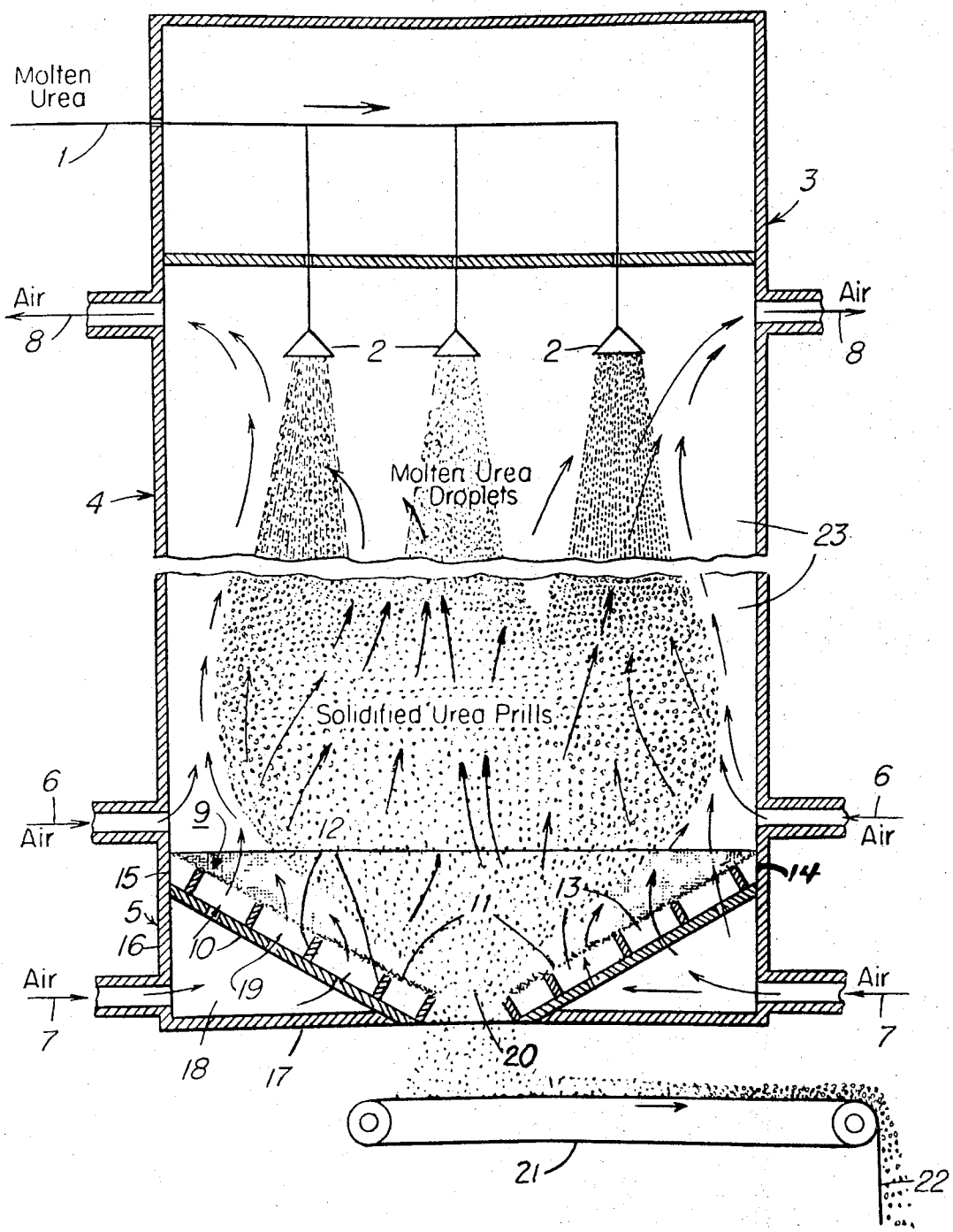

ABSTRACT OF THE DISCLOSURE

Urea is prilled by spraying urea droplets downwardly into a solidification zone where it is contacted with a substantially inert gas. Prills are directed into a collector by diverting their flow by directing a gas through a perforated, inverted cone or pyramid located at the bottom of and in communication with said zone.

---

This application is a continuation-in-part of application Ser. No. 104,998, filed Jan. 8, 1971 as is related pending application Ser. No. 255,726, filed May 22, 1972. Application Ser. No. 104,998 has been abandoned.

FIELD OF INVENTION

This invention is related to the processing of an aqueous urea solution to anhydrous solid urea of the shape of small spherical particles usually called urea prills.

BACKGROUND OF THE INVENTION

Urea is commercially obtained by reacting $NH_3$ and $CO_2$ at elevated pressure and temperature to form ammonium carbamate and to simultaneously dehydrate ammonium carbamate to urea. The aqueous urea solution produced in a urea synthesis plant usually contains about one mole of water per mole of urea formed in the urea synthesis reactor. The aqueous urea product solution (generally 75–76 weight percent) is usually processed to a solid anhydrous form by means of the following sequential steps:

1. Practically all of the water contained in the aqueous urea product solution is evaporated to form a more or less pure urea melt;
2. The resulting urea melt at about 270–300° F. is finely divided into small droplets either by means of a spray head, a spinning conical basket, or a vibrating plate, such devices usually being located at the top of a tall, vertical, cylindrical, rectangular or square tower 100–150 feet high;
3. The molten urea droplets are allowed to fall freely inside the tower countercurrently to an uprising stream of ambient air;
4. The finely divided urea droplets in their free fall inside the tower are cooled by the uprising stream of ambient air and they are frozen into the shape of small spherical particles (prills);
5. The frozen prills are usually cooled further to about 100–150° F. and are collected at the bottom of the tower.

Alternate techniques can be used to produce molten urea in step 1 described above. One is the crystal-melting technique, which consists of crystallizing the aqueous urea product solution to produce pure crystal urea, which is washed, dried and remelted to produce a substantially pure urea melt.

Referring to the step 5 described above, various methods of collecting solid urea prills at the bottom of the prilling tower have been proposed according to the prior art. In general these methods, mainly listed below, have certain specific disadvantages.

One method consists of collecting the solid urea prills by means of a prilling tower bottom of the shape of a truncated inverted cone or pyramid, with steep, flat sides with an opening at the bottom apex of the inverted cone, through which the prilled urea product is withdrawn. This type of prill collecting bottom has the drawback of frequent solid urea buildup on the conical sides and on the bottom section of the inverted cone, with consequent plant shut downs for cleaning operation. Another drawback of this type of prill collecting bottom is the fact that relatively taller and thus more expensive prilling towers are required due to the very steep angle with the horizontal, 60° or more, at which the sides of the inverted cone must be designed in order to facilitate the sliding of the solid prilled urea product towards the bottom opening.

Still another commonly used method consists of collecting the solid prilled urea product by means of a flat horizontal prill tower bottom, which is provided with a collecting rake travelling in a circular motion and thus pushing the solid prilled urea product toward the center of the horizontal prill tower bottom for discharge onto a belt conveyor. Such a prilling tower usually has the drawback of solid urea build up on the prilling tower bottom and on the collecting rake, and the drawback of a relatively higher product degradation due to attrition with a consequent greater air pollution problem in the subsequent solid handling steps.

A third method commonly used in the industry consists of collecting the solid prilled urea product by means of a horizontal fluidized bed of solid urea prills of several inches in depth, which is maintained fluidized by blowing a substantial amount of air through a perforated horizontal metallic surface upwardly into the prilling tower. The excess solid prilled urea product collected in the bottom fluidized bed is overflowed from the fluidized bed over a weir and into a collecting trough. Such a method has the drawback of the instability of the operation due to the collapsing of the fluidized bed of urea prills at the slightest variation in air flow through the perforated horizontal surface. Another drawback of this method is the relatively high electrical power consumption by the large air blowers required to maintain the bed of solid urea prills properly fluidized throughout the full horizontal cross sectional area of the prilling tower bottom section.

For example, in U.S. Pat. No. 3,615,142 (Dahlbom), a prilling tower with an inverted frustum trough bottom exit is described. A louver construction is employed in the trough for the purpose of air being passed through the louvers to cool the prills falling through the tower. This construction has the disadvantage of offering relatively large surface areas of the louvers on which prills can collect. With a louvered construction, there is a substantial build up of prills upon the individual louvers and large dead air areas. With this build up of prills, it is difficult to remove the prills from the bottom section of the tower. With excessive prill build up on the louvers, air flow is seriously reduced; then, hot soft prills fall to the bottom and aggregate and cause physical failure of the louvers. Further, the air is not finely dispersed passing through the louvers.

In U.S. Pat. No. 3,457,336 (Harris), urea or other droplets of molten material are passed through a zone containing a dust bearing gas in order to obtain substantially spherical granules. In all of the arrangements described, a primary source of air is introduced directly into the bottom exit of the system. Secondary, and even tertiary, air sources are employed, particularly to maintain a fluidized bed of dust particles.

With the primary air introduced through the prill exit, there is no control of the falling prills and they tend to build up upon the walls of the tower directly above or in the vicinity of the exit. Then, as the prills stick to the tower walls, they plug the tower completely above the exit and the tower must be taken out of service for cleaning.

A fluidized bed requires a tremendous amount of power for the fluidizing air flow required to maintain such a bed. Fluctuation of air supply will lead to collapse of the bed.

It has been found that by operating a prilling tower bottom according to the process described further below, all the drawbacks which are inherent to the prior art described above are greatly reduced, if not completely eliminated.

SUMMARY OF THE INVENTION

In accordance with the present invention, there is provided a process for prilling urea and other substances. With regard to urea, molten substantially anhydrous urea is sprayed and falls freely downwardly through a solidification zone in the form of droplets which are contacted with a substantially inert and relatively cooler gas passed into said zone. The droplets are cooled thereby and are solidified as substantially anhydrous prills. The prills are collected in a collecting through located at the bottom of the solidification zone. A gas is passed through the collecting trough countercurrently to the downwardly flowing prills, the collecting trough comprising an inverted cone or pyramid the apex of which defines an open discharge zone and the sides of which are perforated and oblique and which allow said gas to pass therethrough as a fine dispersion to the solidification zone. The amount of gas is sufficient to divert the downwardly flowing prills from their substantially vertical path to the discharge zone to substantially prevent the downwardly flowing prills from contacting the perforated oblique sides, and to avoid build-up of the prills upon said perforated oblique sides.

DRAWING

The figure is an elevational view of a prilling tower illustrative of the invention.

SPECIFIC EMBODIMENT OF THE INVENTION

Referring to the drawing, stream 1 containing substantially molten urea at about 280° F. is passed through spray heads 2, located in top section 3 of prilling tower 4. The molten urea sprayed into a stream of small liquid droplets through spray heads 2 is allowed to fall freely inside the prilling tower 4 countercurrently to an uprising stream of ambient air introduced into the prilling tower at its bottom section 5. This ambient air, introduced into the prilling tower through openings 6 and 7, in its upwardly flow picks up heat from the molten urea which crystallizes in the shape of small spherical particles (prills). The hot solid urea prills are further cooled to about 10–20° F. above the ambient temperature of the air in openings 6 and 7 during their free fall inside the tower 4.

The ambient air introduced into the prilling tower 4 is heated up by the equivalent amount of heat released by the urea prills during their free fall, and it is discharged from the prilling tower 4 through openings 8 located in or near top section 3.

The bottom section 5 of prilling tower 4 is provided with a hollow collecting trough 9 in the form of an inverted cone or frustum with sides 10 made of suitable material as concrete or metal. The sides 10 of the inverted trough 9 are solid and are at an approximate angle of about 20–30° with the horizontal, and they are covered from the inside with fine wire mesh 11, which is held in place by means of spacers 12. The wire mesh is provided to disperse the air which is passed therethrough; it has little surface area such that product cannot collect thereon. The surface area of the solid portion of the mesh is substantially smaller than the surface area of the openings therein. The dead air areas of the mesh are minimal. Spacers 12 are positioned in such a manner as to maintain the wire mesh cover 11 at an approximate distance of about 1–2 inches from the sides 10.

Free space 13 between the wire mesh 11 and the sides 10 is sealed at its ends 14 and 15, respectively, so as to form a sealed chamber all around the total surface of the sides 10. Further, vertical walls 16 and flat bottom 17 of the bottom section 5 of prilling tower 4 form a sealed chamber 18 with the sides 10 of the inverted trough 9. As shown in this preferred embodiment, a minor portion, from about 5 to about 30 percent by volume, of the total amount of ambient air fed to the prilling tower 4 is passed into sealed chamber 18 through line 7 and thence through openings 19 provided on the sides 10 into space 13 between the wire mesh 11 and the sides 10. It is to be understood that all of the air employed can be fed through line 7. The ambient air of line 7 is evenly distributed along the whole surface of the trough 9 by being passed through the wire mesh 11 and is finely dispersed as it passes through the wire mesh. As it leaves the wire mesh surface, the air is sufficient to divert the free falling solid urea prills from their vertical path to an oblique path which is converging toward bottom opening 20, located at the apex of the inverted trough 9. Thus, substantially all of the prills do not impinge upon mesh 11, but are diverted toward bottom opening 20. This prevents undesirable build up of the prills on the surface of mesh 11, which would impede upward air flow and reduce the efficiency of tower operation. Due to the fact that there is practically no upward air flow in the section just above the bottom opening 20, the solid urea prilled product falls through the bottom opening 20 onto belt conveyor 21, from which it is discharged at 22 ready for storage or bagging. As indicated, air is not introduced into bottom opening 20 countercurrent to the product passing therethrough. A rubber or other flexible skirt (not shown) can be located around the bottom opening 20 to seal the bottom product discharge area, and to minimize leakage of air from solidification zone 23.

Urea dust present in the tower is removed through bottom opening 20 and can be separated from urea prills as undersized material in a commercial shaker or the like (not shown). In contrast to prior art towers, the dust is not blown upwardly and out of the tower. Thus, pollution problems are minimized with the method of this invention.

In this preferred embodiment, a major portion, from about 95 to about 70 percent by volume, of the ambient air fed to the prilling tower 4 is introduced into the bottom section 5 through openings 6 located above and preferably just above the inverted trough 9. This air is mixed with the smaller portion of the ambient air introduced into the prilling tower 4 through line 7; the total mixture of the two streams of ambient air rises through the prilling tower 4 and it is exhausted from the top section 3 of the prilling tower 4 through openings 8.

Since the urea droplets are solidified in tower 4, the portion of the tower below spray heads 2 and above trough 9 is considered to comprise solidification zone 23.

In another embodiment, the major portion of ambient air can be introduced into the upper section 3 of the prilling tower 4 through the openings 8, passed downwardly and co-currently to the stream of free falling product and exhausted from the prilling tower 4 through the openings 6 on the bottom section 5 of the prilling tower 4 together with the minor portion of air introduced into the prill collecting inverted trough 9 through openings and line 7.

EXAMPLE

Referring to the figure, a stream of 25,000 lbs./hr. of molten urea, at about 280° F., containing about 0.2 weight percent of water and about 0.3 weight percent of biuret, is passed through line 1 and is sprayed through a system of spray heads 2 inside a prilling tower 4 having a circular cross-section about 25 feet in diameter. The fine droplets of molten urea thus formed are allowed to fall freely inside the prilling tower 4 for its full height of about 140 feet countercurrently to a stream of uprising air, which is exhausted at about 95° F. to the atmosphere through openings 8 located in the upper section 3 of the prilling tower 4.

The total amount of air exhausted to the atmosphere through the openings 8 is an amount of about 200,000 standard cubic feet per minute (s.c.f.m.), of which amount about 170,000 s.c.f.m. is introduced into the bottom section 5 of the prilling tower 4 through lines 6 at about 70° F.

By the time the free falling urea particles reach the bottom section 5 of prilling tower 4 they are solidified into the shape of small spheres of about 1.5 mm. in diameter and are cooled to about 100° F.

About 30,000 s.c.f.m. of ambient air at about 70° F. is introduced into the sealed chamber 18 of the prill collecting inverted trough 9; through openings 19, the air is passed through a 50 mesh wire cloth 11 covering the sides 10. This amount of ambient air forced through the wire mesh 11 at a relatively high velocity diverts the free falling urea prills from their vertical path into an oblique path converging toward the bottom opening (circular) 20 of about 3 feet in diameter located in the center of the tower cross-section.

The solid urea prills at about 100° F. are discharged through bottom opening 20 onto belt conveyor 21 and are delivered to storage or bagging at 22. Stream 22 consists of 25,000 lbs./hr. of solid prilled urea containing about 0.2 weight percent of water and about 0.3 weight percent of biuret.

Air is shown as a suitable gas for cooling and diverting free falling solid material in tower 4. It is to be understood that any gas substantially inert to the solid material, as urea, can be employed. In addition to dry or humid air, or in admixture therewith, there can be used: nitrogen and carbon dioxide. $SO_2$ and $SO_3$ can also be employed with urea, some sulfur or sulfur compound forming on urea prills as a coating therefor. Steam is not suitable, since it would increase the moisture content in the prilled product.

Instead of forming urea prills, the process can be used to form and collect such fertilizer substances as ammonium nitrate, ammonium phosphate, calcium nitrate, calcium phosphate, potassium chloride, etc., from molten streams thereof charged to tower 4 from line 1. A mixture of two or more of such substances, including urea, can be so charged through line 1.

Mesh 11 can be replaced by other suitable elements which provide desired fine air dispersions. A substitute can be, for example, a perforated plate preferably having a total opening area larger than plate surface area.

I claim:

1. In a process for prilling urea, comprising:
   (a) spraying molten, substantially anhydrous urea downwardly as droplets in a prilling tower through a solidification zone therein generally toward the bottom of the tower;
   (b) contacting said droplets with a substantially inert gas passed into said zone to cool and solidify said droplets as anhydrous prills; and
   (c) collecting said prills at a centrally located bottom of said zone;
   the improvement comprising:
   (d) passing a minor amount, from about 5 to about 30 percent by volume, of said inert gas through a hollow, perforated, inverted frustum trough, and passing the balance of said inert gas into said solidification zone above said trough, all of said gas being passed countercurrently to said downwardly falling prills, and maintaining gas flow, gas velocity and the angle of said trough through which said gas is so passed as a fine dispersion, so as to divert said downwardly flowing prills from a substantially vertical path to an oblique path toward said bottom of said zone and to prevent substantially all of said prills from contacting said trough.

2. The process of Claim 1, wherein said inert gas is air.

3. In a process for producing substantially spherical fertilizer particles, comprising:
   (a) spraying molten, substantially anhydrous fertilizer in finely divided particle form downwardly in a tower through a solidification zone generally toward the bottom of said tower;
   (b) contacting said particles with a substantially inert gas passed into said zone to cool and solidify said particles; and
   (c) collecting the resulting cooled and solidified particles at a centrally located bottom of said zone;
   the improvement comprising:
   (d) passing a minor portion, from about 5 to about 30 percent by volume, of said inert gas through a hollow, perforated, inverted frustum trough, and passing the balance of said inert gas into said solidification zone above said trough, all of said gas being passed countercurrently to said downwardly falling cooled and solidified particles, and maintaining gas flow, gas velocity and the angle of said trough through which said gas is so passed as a fine dispersion, so as to divert said downwardly flowing cooled and solidified particles from a substantially vertical path to an oblique path toward said bottom of said zone and to prevent substantially all of said cooled and solidified particles from contacting said trough.

4. The process of Claim 3, wherein said inert gas is air.

References Cited
UNITED STATES PATENTS

| | | | |
|---|---|---|---|
| 3,615,142 | 10/1971 | Dahlbom | 264—13 |
| 3,457,336 | 7/1969 | Harris | 264—14 |

ROBERT F. WHITE, Primary Examiner

J. R. HALL, Assistant Examiner